US012791853B2

(12) United States Patent
Shiraishi

(10) Patent No.: US 12,791,853 B2
(45) Date of Patent: Nov. 10, 2026

(54) LENS-MIRROR ARRAY

(71) Applicant: TOSHIBA TEC KABUSHIKI KAISHA, Tokyo (JP)

(72) Inventor: Takashi Shiraishi, Kawasaki Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 275 days.

(21) Appl. No.: 18/642,141

(22) Filed: Apr. 22, 2024

(65) Prior Publication Data

US 2024/0418983 A1 Dec. 19, 2024

(30) Foreign Application Priority Data

Jun. 14, 2023 (JP) ................................ 2023-098056

(51) Int. Cl.

| | |
|---|---|
| ***G02B 26/12*** | (2006.01) |
| ***B41J 2/47*** | (2006.01) |
| ***G03G 15/043*** | (2006.01) |
| ***H04N 1/024*** | (2006.01) |
| ***H04N 1/028*** | (2006.01) |

(52) U.S. Cl.

CPC .............. *G02B 26/12* (2013.01); *B41J 2/471* (2013.01); *G03G 15/0435* (2013.01); *H04N 1/02409* (2013.01); *H04N 1/0281* (2013.01)

(58) Field of Classification Search

CPC .... G02B 17/08; G02B 26/12; G02B 27/0018; G03G 15/04036; G03G 15/0409; H04N 1/02409; H04N 1/0281; H04N 1/0308

See application file for complete search history.

(56) References Cited

U.S. PATENT DOCUMENTS

2013/0314797 A1* 11/2013 Shiraishi .............. G02B 3/0056 359/627
2014/0204430 A1 7/2014 Shiraishi
2014/0204474 A1 7/2014 Shiraishi
(Continued)

FOREIGN PATENT DOCUMENTS

JP 2022-094439 A 6/2022

OTHER PUBLICATIONS

Notice of Reason for Refusal dated Apr. 28, 2026 issued in JP Application No. 2023-098056, with English translation, 6 pages.

*Primary Examiner* — Jonathan Y Jung

(74) *Attorney, Agent, or Firm* — FOLEY & LARDNER LLP

(57) ABSTRACT

A lens-mirror array includes a second optical element arranged adjacent to a first optical element in a main-scan direction. The first optical element has an incident surface, a first reflection surface, and an exit surface. The incident surface is shaped to transmit and focus a light incident on the incident surface. The first reflection surface has positive optical power and is configured to reflect and focus the light entering through the incident surface. The exit surface outputs the light reflected by the first reflection surface. The second optical element includes a second reflection surface. A travel blocking portion is provided between the first reflection surface and the second reflection surface. A reflectance reduction layer is provided in the travel blocking portion to set light reflectance in the travel blocking portion to be lower than that of the first reflection surface.

20 Claims, 9 Drawing Sheets

(56) References Cited

U.S. PATENT DOCUMENTS

| | | | | |
|---|---|---|---|---|
| 2016/0216635 | A1* | 7/2016 | Shiraishi ............ | G03G 15/0409 |
| 2016/0323474 | A1 | 11/2016 | Imoto et al. | |
| 2017/0052368 | A1* | 2/2017 | Takahashi ............ | B60K 35/232 |
| 2021/0120141 | A1* | 4/2021 | Shiraishi .............. | H04N 1/1039 |

* cited by examiner

LENS-MIRROR ARRAY

CROSS-REFERENCE TO RELATED APPLICATION

This application is based upon and claims the benefit of priority from Japanese Patent Application No. 2023-098056, filed on Jun. 14, 2023, the entire contents of which are incorporated herein by reference.

FIELD

Embodiments described herein relate to e.g. a lens mirror array used for a scanner of an image forming apparatus including a copy machine and a printer installed in a workplace and an exposure apparatus.

BACKGROUND

For example, a scanner of an image forming apparatus has an integrated array including a lens and a mirror (hereinafter, referred to as "lens-mirror array") for refracting, reflecting, and collecting a light reflected by a document surface on a charge coupled device (CCD) sensor or the like. The lens-mirror array has e.g. a plurality of optical elements arranged in main-scan directions. The lens-mirror array may be formed by e.g. integral molding of a transparent resin.

Each optical element has an incident-side lens surface into which a reflected light from a document is entered, an exit-side lens surface outputting the entered light toward a CCD sensor, and at least one reflection surface guiding the entering the light via the incident-side lens surface to the exit-side lens surface. For focusing the light in the main-scan directions, the reflection surface may include a travel blocking portion blocking traveling of the light on both sides in the main-scan directions.

DETAILED DESCRIPTION

Figure 1:
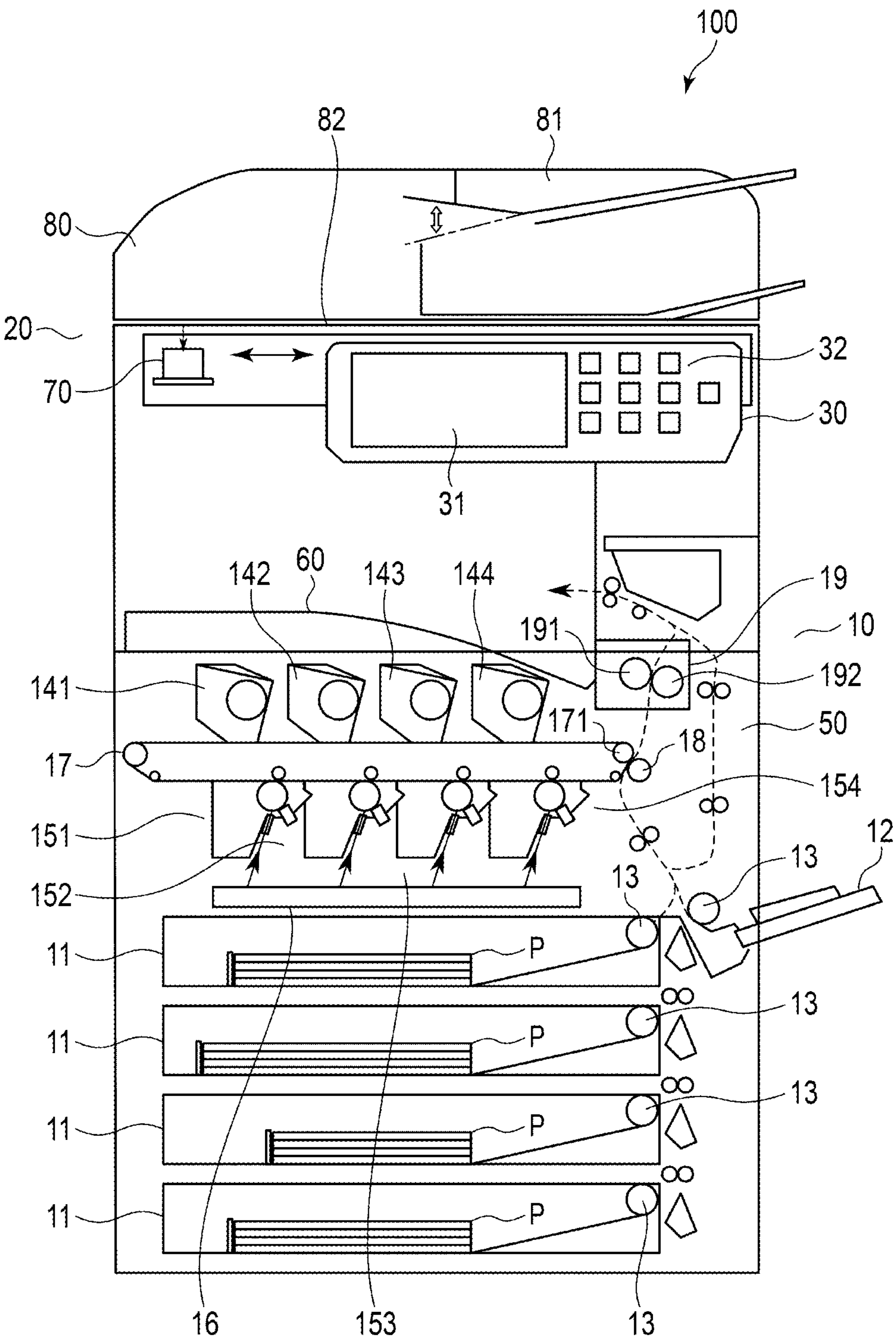
FIG. 1 is a schematic diagram showing an image forming apparatus according to one embodiment.

For example, a part of the optical element is projected outward and a reflection surface is provided in a top portion thereof, and thereby, light shielding films may be provided on side surfaces of the projecting portion (surfaces continuous to both sides in the main-scan directions of the reflection surface). In this case, the light shielding films provided on the side surfaces of the projecting portion serve as the travel blocking portions. However, if such a projecting portion is provided in the optical element, level differences on both sides in the main-scan directions of the reflection surface become larger and, when the lens-mirror array is molded, flows of the resin are disturbed by the level differences and shape accuracy of the reflection surface is hard to be secured.

A challenge to be solved is to provide a lens-mirror array in which optical elements having reflection surfaces with higher shape accuracy are arranged.

A lens-mirror array of an embodiment has a plurality of optical elements arranged in main-scan directions. Each optical element has an incident surface, at least one reflection surface, an exit surface, a travel blocking portion, and a reflectance reduction unit. The incident surface transmits and focuses an incident light. The reflection surface has positive optical power, reflecting and focusing the light entering via the incident surface. The exit surface outputs the light reflected by the reflection surface. The travel blocking portion is provided between the reflection surface and the reflection surface of the other optical element adjacent thereto in the main-scan directions without a level difference. The reflectance reduction unit is provided in the travel blocking portion to set light reflectance in the travel blocking portion to be lower than that of the reflection surface.

As below, an image forming apparatus 100 according to one embodiment will be explained with reference to the drawings. Note that, in the respective drawings used for the following explanation of the embodiments, scales of the respective parts may be appropriately changed. Further, in the respective drawings used for the following explanation of the embodiments, some configurations may be omitted for clear explanation.

The image forming apparatus 100 of the embodiment is e.g. a multifunction peripheral (MFP). The image forming apparatus 100 has a printing function, a scanning function, a copying function, a decoloring function, a facsimile function, etc. The printing function is a function of forming a toner image on paper P. The scanning function is a function of reading an image from a document having the image formed thereon or the like. The copying function is a function of printing e.g. an image read from a document or the like using the scanning function on paper P using the printing function. The decoloring function is a function of decoloring an image formed on paper P using a decolorable developer.

The image forming apparatus 100 includes a printer 10, a scanner 20, and an operation panel 30.

The printer 10 includes a plurality of paper feed cassettes 11, a manual feed tray 12, and a plurality of paper feed rollers 13. The paper feed cassette 11 holds paper P used for printing. The manual feed tray 12 is for manual feed of paper P. The paper feed rollers 13 rotate to selectively pick up paper P from either the paper feed cassette 11 or the manual feed tray 12.

The printer 10 includes four toner cartridges 141, 142, 143, 144, four image forming units 151, 152, 153, 154, an optical scanning device 16, a transfer belt 17, a secondary transfer roller 18, and a fixing unit 19.

The toner cartridges 141, 142, 143, 144 contain toner supplied to the image forming units 151, 152, 153, 154, respectively. The toner cartridge 141 contains yellow (Y) toner. The toner cartridge 142 contains magenta (M) toner. The toner cartridge 143 contains cyan (C) toner. The toner cartridge 144 contains black (K) toner. The combination of the toner colors is not limited to YMCK, but may be another combination of colors. Further, the toner may be toner decolored at a higher temperature than a predetermined temperature.

The image forming units 151 to 154 receive supply of the toner from the toner cartridges 141 to 144, respectively, and form toner images in different colors. The image forming unit 151 forms a yellow (Y) toner image. The image forming unit 152 forms a magenta (M) toner image. The image forming unit 153 forms a cyan (C) toner image. The image forming unit 154 forms a black (K) toner image.

Figure 2:
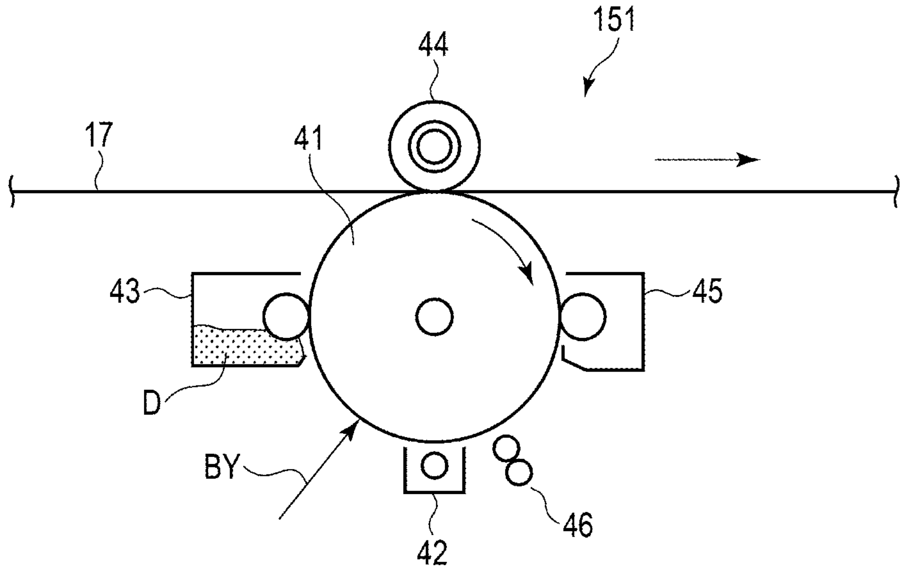
FIG. 2 is a schematic diagram showing an image forming unit.

The image forming units 151 to 154 have the same configuration except that the toner is different. Therefore, here, the image forming unit 151 for yellow will be representatively explained with reference to FIG. 2 and the explanation of the image forming units 152 to 154 for the other colors will be omitted.

The yellow image forming unit 151 includes a photoreceptor drum 41, a charging device 42, a developing device 43, a primary transfer roller 44, a cleaner 45, and a charge remover lamp 46.

The photoreceptor drum 41 has a surface receiving a light beam BY radiated from the optical scanning device 16. The optical scanning device 16 forms a latent image on the surface of the photoreceptor drum 41. The charging device 42 positively charges the surface of the photoreceptor drum 41. The developing device 43 develops the latent image on the surface of the photoreceptor drum 41 using yellow toner D supplied from the toner cartridge 141. That is, the developing device 43 forms a yellow toner image on the surface of the photoreceptor drum 41.

Further, the image forming unit 151 has the primary transfer roller 44 in a position facing the photoreceptor drum 41 with the transfer belt 17 in between. The primary transfer roller 44 generates a transfer voltage between the photoreceptor drum 41 and itself. Thereby, the primary transfer roller 44 transfers the toner image on the surface of the photoreceptor drum 41 to the surface of the transfer belt 17 in contact with the photoreceptor drum 41 (e.g., completing a primary transfer).

The cleaner 45 removes the toner left on the surface of the photoreceptor drum 41. The charge remover lamp 46 removes electric charge left on the surface of the photoreceptor drum 41.

The optical scanning device 16 irradiates the surfaces of the photoreceptor drums 41 of the image forming units 151, 152, 153, 154 with light beams BY, BM, BC, BK according to input image data, respectively. The light beams BY, BM, BC, BK are based on image data of the respective colors formed by color separation of the image data into Y, M, C, K colors. The optical scanning device 16 outputs the light beam BY and forms a latent image for yellow on the surface of the photoreceptor drum 41 of the image forming unit 151 according to the image data for Y component. Similarly, the optical scanning device 16 outputs the light beams BM, BC, BK and forms latent images for the respective colors on the surface of the photoreceptor drums 41 of the image forming units 152, 153, 154 according to the image data for M, C, K components.

Note that the image data input to the optical scanning device 16 is e.g. image data read from a document or the like by the scanner 20. Alternatively, the image data input to the optical scanning device 16 is image data transmitted from another apparatus than the image forming apparatus 100 to the image forming apparatus 100.

The transfer belt 17 is tensionally provided in an endless form and rotates by rotation of a drive roller 171 around which the transfer belt 17 is looped. The transfer belt 17 rotates, and thereby, conveys the toner images of the respective colors formed in superimposition on the surface of the transfer belt 17 by the image forming units 151 to 154 to a transfer area facing the secondary transfer roller 18.

The secondary transfer roller 18 faces the drive roller 171 with the transfer belt 17 in between. The secondary transfer roller 18 transfers the toner images formed on the transfer belt 17 on paper P passing between the secondary transfer roller 18 and itself (e.g., completing a secondary transfer).

The fixing unit 19 heats and pressurizes the paper P. The fixing unit 19 includes a heat roller 191 and a pressure roller 192 facing each other with the conveyance path of the paper P in between.

The heat roller 191 includes a heat source such as a heater. The heat roller 191 heated by the heat source heats the paper P. The pressure roller 192 pressurizes the paper P passing between the pressure roller 192 and the heat roller 191. Therefore, the fixing unit 19 fixes the toner images transferred onto the paper P.

The printer 10 additionally includes a double-side unit 50 and an ejection tray 60. The double-side unit 50 sets the paper P to be printed on a back surface. The double-side unit 50 switches back the paper P to turn the paper P and sends the paper to the transfer area between the transfer belt 17 and the secondary transfer roller 18. The ejection tray 60 is for ejection of the paper P finished with printing.

The scanner 20 reads an image from a document or the like. The scanner 20 includes a reading module 70 and a document feeder 80.

The reading module 70 radiates an illumination light on a surface of a document having an image to be read (hereinafter, referred to as "document surface") and receives the reflected light thereof by an image sensor 76 (FIG. 3) and converts the light into a digital signal. Thereby, the reading module 70 reads the image from the document surface. The reading module 70 includes a lens-mirror array 1.

The document feeder 80 is e.g. an auto document feeder (ADF) or the like. The document feeder 80 conveys documents mounted on a document tray 81 one after another through a document glass 82. The reading module 70 reads images from the documents conveyed to the document glass 82. The document feeder 80 may include another reading module for reading images from the back surfaces of the documents.

The operation panel 30 is a man-machine interface for input and output between the image forming apparatus 100 and an operator of the image forming apparatus 100. The operation panel 30 (e.g., a user interface) includes e.g. a touch panel 31 and an input device 32.

The touch panel 31 is formed by e.g. stacking of a display such as a liquid crystal display or an organic EL display and a pointing device by touch input. The display of the touch panel 31 displays a window for notifying the operator of the image forming apparatus 100 of various kinds of information. Further, the touch panel 31 receives touch operation by the operator.

The input device 32 receives operation by the operator of the image forming apparatus 100. The input device 32 is e.g. a keyboard, a keypad, or a touch pad.

Figure 3:
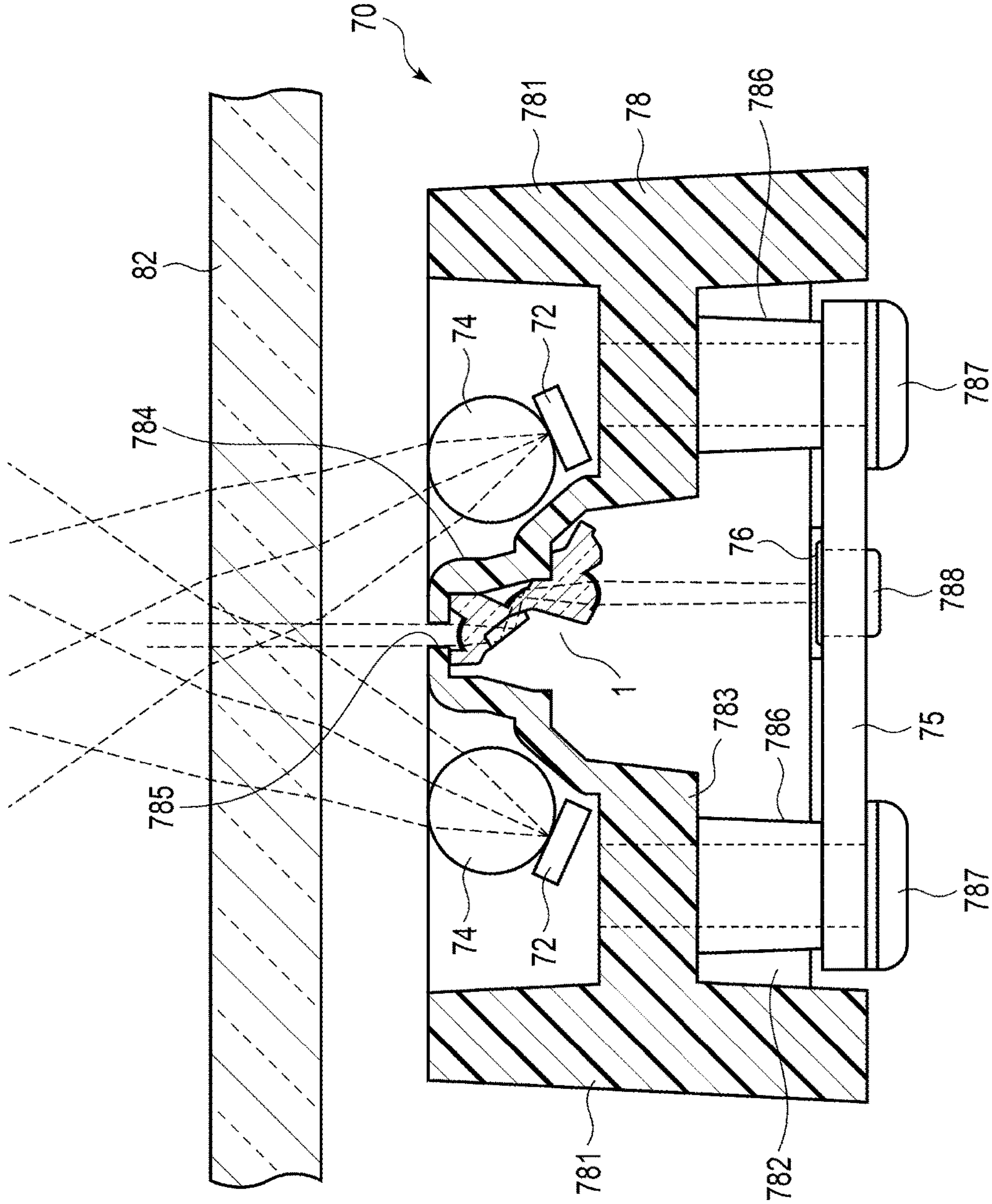
FIG. 3 is a sectional view showing a reading module of a scanner.

As shown in FIG. 3, the reading module 70 includes the lens-mirror array 1 according to a first embodiment, two reflectors 72, two light guides 74, the image sensor 76, and a holder 78 (e.g., a frame, chassis, or housing). The holder 78 positions and holds the lens-mirror array 1, the reflectors 72, the light guides 74, and the image sensor 76 (e.g., a substrate 75 with the image sensor 76 mounted thereon).

Figure 4:
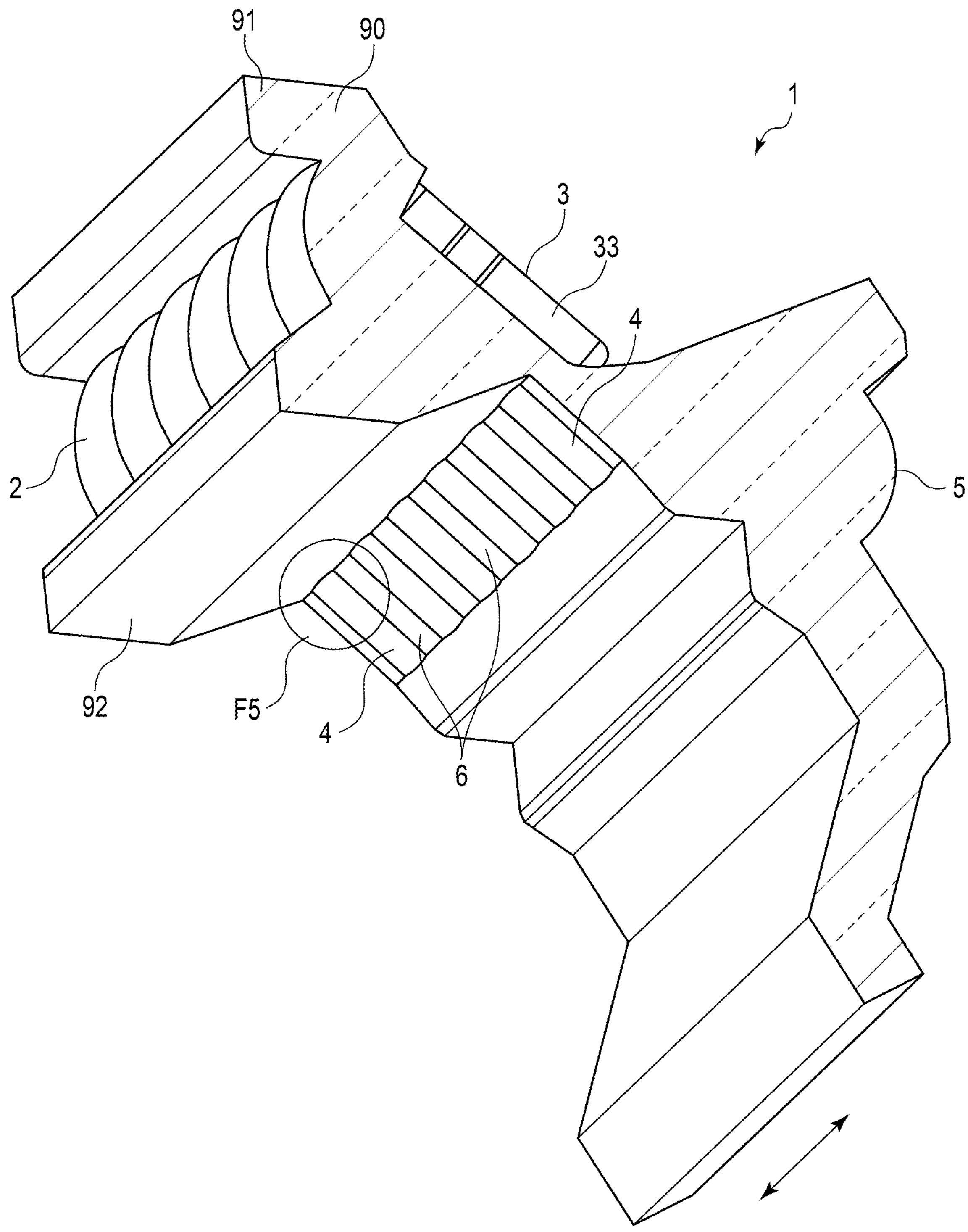
FIG. 4 is an appearance perspective view showing a lens-mirror array according to a first embodiment incorporated in the reading module in FIG. 3.

As shown in FIG. 4, the lens-mirror array 1 has an elongated structure extending in the main-scan directions (directions of arrows). The lens-mirror array 1 forms an erected image of an image on the document surface on the image sensor 76. Accordingly, the reading module 70 is moved in sub-scan directions shown by arrows in FIG. 1 along the document glass 82, and thereby, the whole image on the document surface may be read by the image sensor 76.

The image sensor 76 has an elongated structure extending in the main-scan directions. The image sensor 76 is a line sensor in which a plurality of imaging devices converting lights in electrical signals are linearly arranged in the main-scan directions. The image sensor 76 includes one or more line sensors. The image sensor 76 may include e.g. a Charge Coupled Device (CCD), a Complementary Metal Oxide Semiconductor (CMOS), or another imaging device.

The holder 78 has an elongated structure extending in the main-scan directions. The holder 78 may be formed by integral molding of a resin using a die. The holder 78 has a pair of side walls 781 placed along the main-scan directions, a pair of end walls 782 (e.g., extending substantially perpendicular to the side walls 781) placed in both end portions in longitudinal directions of the side walls 781 (only the deeper one is shown in FIG. 3), and a partition wall 783 connecting inner surfaces of intermediate portions in the upward and downward directions of the pair of side walls 781 and inner surfaces of intermediate portions in the upward and downward directions of the pair of end walls 782. The intermediate portion in the sub-scan directions (leftward and rightward directions in the drawing of FIG. 3) of the partition wall 783 forms a bulging portion 784 bulging upward. The bulging portion 784 has an elongated structure extending in the main-scan directions.

The bulging portion 784 of the holder 78 has a diaphragm opening 785 in a rectangular slit shape extending in the main-scan directions nearly at the center in the sub-scan directions. The diaphragm opening 785 passes the reflected light from the document surface, reduces the width of the reflected light in the sub-scan directions, and guides the light to the lens-mirror array 1. The holder 78 holds the lens-mirror array 1 inside of the bulging portion 784, i.e., the downside of the diaphragm opening 785 in the drawing. The width in the sub-scan directions of the diaphragm opening 785 is smaller than a width with which the reflected light from the document passing through the diaphragm opening 785 enters a plurality of incident-side lens surfaces 2 (FIG. 4) of the lens-mirror array 1. The diaphragm opening 785 is placed so that the optical axes in the sub-scan directions of the incident-side lens surfaces 2 may pass through the center in the sub-scan directions of the diaphragm opening 785.

The holder 78 holds the reflectors 72 and the light guides 74 on both sides with the bulging portion 784 in between along the sub-scan directions inside of the two side walls 781 and above the partition wall 783. The illustration and the explanation of the holding structure of the reflectors 72 and the light guides 74 are omitted.

The reflector 72 has e.g. an elongated rectangular plate shape extending in the main-scan directions. The reflector 72 has a reflection surface facing a light diffusion portion (not shown) in which concavities and convexities are provided or white ink is applied of the light guide 74. The reflector 72 is formed by application of white ink on the reflection surface thereof or formation of white resin in a rectangular plate shape. The reflector 72 has a function of reflecting and returning the light leaking from the light diffusion portion of the light guide 74 to the light guide 74.

The light guide 74 is e.g. a transparent resin substantially in a cylindrical shape elongated in the main-scan directions, and has the above described light diffusion portion along the longitudinal directions in a part of the surface thereof. The light guide 74 guides a light output from an LED light source (not shown) placed on one end in the longitudinal direction thereof. The reflector 72 reflects and returns the light leaking out from the light diffusion portion of the light guide 74 to the light guide 74.

The bulging portion 784 of the partition wall 783 of the holder 78 is located between the two light guides 74, and it is necessary to place the light guides apart from each other at a fixed distance in the sub-scan directions so that the bulging portion 784 may not make a shadow of the illumination light. On the other hand, if the two light guides 74 are placed apart in the sub-scan directions, the angle of the illumination light radiated on the image reading area on the document surface becomes larger and the illuminance change becomes larger when the distance between the document glass 82 and the document surface changes. Accordingly, it is desirable that the two light guides 74 are placed as close as possible to each other in the sub-scan directions.

The holder 78 has a plurality of bosses 786 or spacers projecting downward from the lower surface of the partition wall 783 in the drawing. The bosses 786 are provided in e.g. three locations at both ends and the center in the main-scan directions of the partition wall 783 on both sides in the sub-scan directions of the bulging portion 784. These six bosses 786 are for respectively fixing the substrate 75 to the holder 78 using fasteners, shown as screws 787. Note that the holder 78 includes a plurality of bosses 788 for positioning the substrate 75 to the holder 78.

As below, the lens-mirror array 1 will be explained with reference to FIGS. 3 and 4. The lens-mirror array 1 has an integral arrangement structure in which a plurality of transparent optical elements 90 substantially in the same shape are arranged in the main-scan directions. The shape of an effective surface of each optical element 90 has a shape surface-symmetrical with respect to an imaginary center plane passing through the center in the main-scan directions of the optical element 90 and orthogonal to the main-scan directions. In FIG. 3, directions orthogonal to the paper surface are the main-scan directions and the leftward and rightward directions in which the reading module 70 moves in the drawing are the sub-scan directions. FIG. 4 is a partially enlarged perspective view of a part of the lens-mirror array 1 as seen from the opposite side to that in FIG. 3, in which the main-scan directions are shown by arrows.

The lens-mirror array 1 has extension portions (not shown) that can contact when a worker grips the lens-mirror array 1 on both ends in the longitudinal directions in addition to the plurality of optical elements 90. The lens-mirror array 1 of the embodiment is formed by integral molding of the transparent resin. The lens-mirror array 1 may be formed using transparent glass.

Each optical element 90 of the lens-mirror array 1 guides a diffused light from an object point to an imaging point on an image surface. One optical element 90 images lights from a plurality of object points arranged in the main-scan directions on the image surface. For example, one optical element 90 images lights from object points placed in a width two to five times the pitch of the optical elements 90 in the main-scan directions on an image surface. The respective optical elements 90 of the lens-mirror array 1 reflect incident lights twice and output the lights and form erected images of the object points at the imaging points.

Each optical element 90 of the lens-mirror array 1 has the incident-side lens surface 2 (incident surface), an upstream-side reflection surface 3, a downstream-side reflection surface 4 (at least one reflection surface), and an exit-side lens surface 5 (exit surface) on the surface thereof. The incident-side lens surface 2, the downstream-side reflection surface 4, and the exit-side lens surface 5 are free-form surfaces convex outward. The upstream-side reflection surface 3 is a flat surface. The other surfaces of the plurality of optical elements 90 respectively form one flat surface connected in the main-scan directions over the entire length of the lens-mirror array 1.

The incident-side lens surfaces 2 of the optical elements 90 face the diaphragm opening 785 or aperture in the bulging portion 784 of the holder 78. In other words, the lens-mirror array 1 is fixed to the bulging portion 784 with the incident-side lens surfaces 2 of the plurality of optical elements 90 facing the diaphragm opening 785 as shown in FIG. 3. The incident-side lens surface 2 has positive optical power refracting and focusing the incident light reflected by the document surface and passing through the diaphragm opening 785.

The upstream-side reflection surface 3 is adjacent to the incident-side lens surface 2 at the opposite side to a projecting portion 91. That is, the upstream-side reflection surface 3 is located in the optical path of the incident light entering via the incident-side lens surface 2. The upstream-side reflection surface 3 totally reflects the light entering via the incident-side lens surface 2 toward the downstream-side reflection surface 4. The upstream-side reflection surface 3 is located in a top part of a projecting portion formed by projection of a part of the optical element 90 outward. A light-shielding film 33 is applied to the side surface of the projecting portion continuous to the outside in the main-scan directions of the upstream-side reflection surface 3 and the side surface of the projecting portion continuous to the end edge apart from the incident-side lens surface 2 of the upstream-side reflection surface 3.

The downstream-side reflection surface 4 is continuous to the incident-side lens surface 2 at the opposite side to a projecting portion 92. The downstream-side reflection surface 4 is located in the optical path of the reflected light reflected by the upstream-side reflection surface 3. The downstream-side reflection surface 4 totally reflects the reflected light reflected by the upstream-side reflection surface 3 toward the exit-side lens surface 5. The downstream-side reflection surface 4 is a free-form surface having positive optical power reflecting and focusing a light. The width in the main-scan directions of the downstream-side reflection surface 4 is smaller than the width of the optical element 90.

Figure 5:
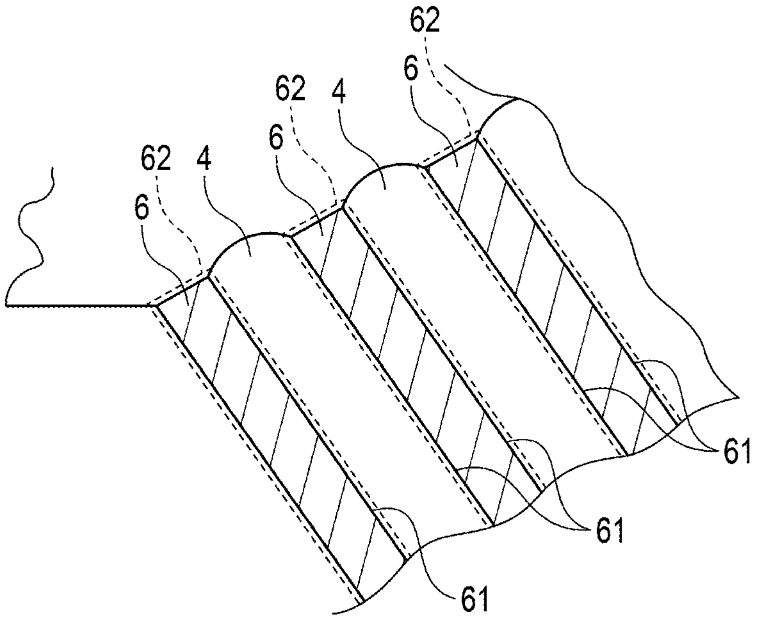
FIG. 5 is a partially enlarged view of an area F5 of the lens-mirror array in FIG. 4.

FIG. 5 is a partially enlarged view of a partial area F5 in FIG. 4. The lens-mirror array 1 has a plurality of travel blocking surfaces 6 (travel blocking portions, processed surfaces) substantially in rectangular shapes between the downstream-side reflection surfaces 4 of the plurality of optical elements 90. The travel blocking surface 6 is a nearly flat surface provided over the two optical elements 90 adjacent to each other in the main-scan directions, and may be a cylindrical surface formed by continuity of lines on which an imaginary surface orthogonal to the center surface of the optical element 90 and the travel blocking surfaces 6 cross in directions orthogonal to the main-scan directions, that is, a surface having a free-form surface shape in the sub-scan directions and a linear shape in the main-scan directions (a shape unchanged depending on the position in the main-scan directions) so that the lens width may be constant. The travel blocking surfaces 6 are provided between the plurality of downstream-side reflection surfaces 4, and thereby, the range of the reflected lights reflected by the downstream-side reflection surfaces 4 may be limited.

The travel blocking surfaces 6 are placed without level differences between the downstream-side reflection surfaces 4 of the optical elements 90 and the downstream-side reflection surfaces 4 of the other optical elements 90 adjacent thereto in the main-scan directions, and have edges 61 (corner portions) in micro recessed groove shapes between the downstream-side reflection surfaces 4 on both sides in the main-scan directions and themselves. In the travel blocking surface 6, a light-shielding film 62 (e.g., a reflectance reduction unit or reflectance reduction layer) having lower light reflectance than at least the downstream-side reflection surface 4 is provided by application and curing of UV-curable light-shielding ink or thermosetting light-shielding ink. The width in the main-scan directions of the light-shielding film 62 is a width covering the edges 61 on both ends in the main-scan directions of the travel blocking surface 6. That is, the width in the main-scan directions of the light-shielding film 62 is slightly larger than the width of the travel blocking surface 6.

The edge 61 functions to absorb the light-shielding ink by capillary action for easily wetly spread over the travel blocking surface 6. The edge 61 is located in the valley part in which the downstream-side reflection surface 4 and the travel blocking surface 6 cross. Accordingly, the shape of the edge 61 is a nearly V-shape in the section formed by cutting of the downstream-side reflection surface 4 and the travel blocking surface 6 by the plane along the main-scan directions. Therefore, when the light-shielding ink is applied from one end side in the longitudinal direction of the edges 61, the light-shielding ink is absorbed along the edges 61 toward the other end side and successfully wetly spreads over the travel blocking surface 6 between the two edges 61.

The exit-side lens surface 5 is located in the optical path of the reflected light reflected by the downstream-side reflection surface 4. The exit-side lens surface 5 has positive optical power transmitting and focusing the reflected light reflected by the downstream-side reflection surface 4.

Note that an imaginary boundary surface (the section in FIG. 4) between the two optical elements 90 adjacent to each other in the main-scan directions is a surface orthogonal to the main-scan directions and substantially orthogonal to the above described respective surfaces 2, 3, 4, 5, 6 of the optical element 90.

As below, functions of the above described lens-mirror array 1 will be explained.

The light reflected by the document surface enters the incident-side lens surfaces 2 of the plurality of optical elements 90. That is, the reflected light from the document surface placed at the object point enters the incident-side lens surface 2. The incident-side lens surface 2 refracts and focuses the incident light and forms an intermediate inverted image.

The upstream-side reflection surface 3 reflects the incident light entering via the incident-side lens surface 2 toward the downstream-side reflection surface 4. The downstream-side reflection surface 4 further reflects the light reflected by the upstream-side reflection surface 3 toward the exit-side lens surface 5.

The exit-side lens surface 5 outputs the light reflected by the downstream-side reflection surface 4 toward the image sensor 76 placed at the imaging point. The exit-side lens surface 5 forms an erected image as an inverted image of the intermediate inverted image formed by the incident-side lens surface 2 in cooperation with the downstream-side reflection surface 4. The output light output from the exit-side lens surface 5 is imaged on the light receiving surface of the image sensor 76 placed at the imaging point.

Figures 6A, 6B:
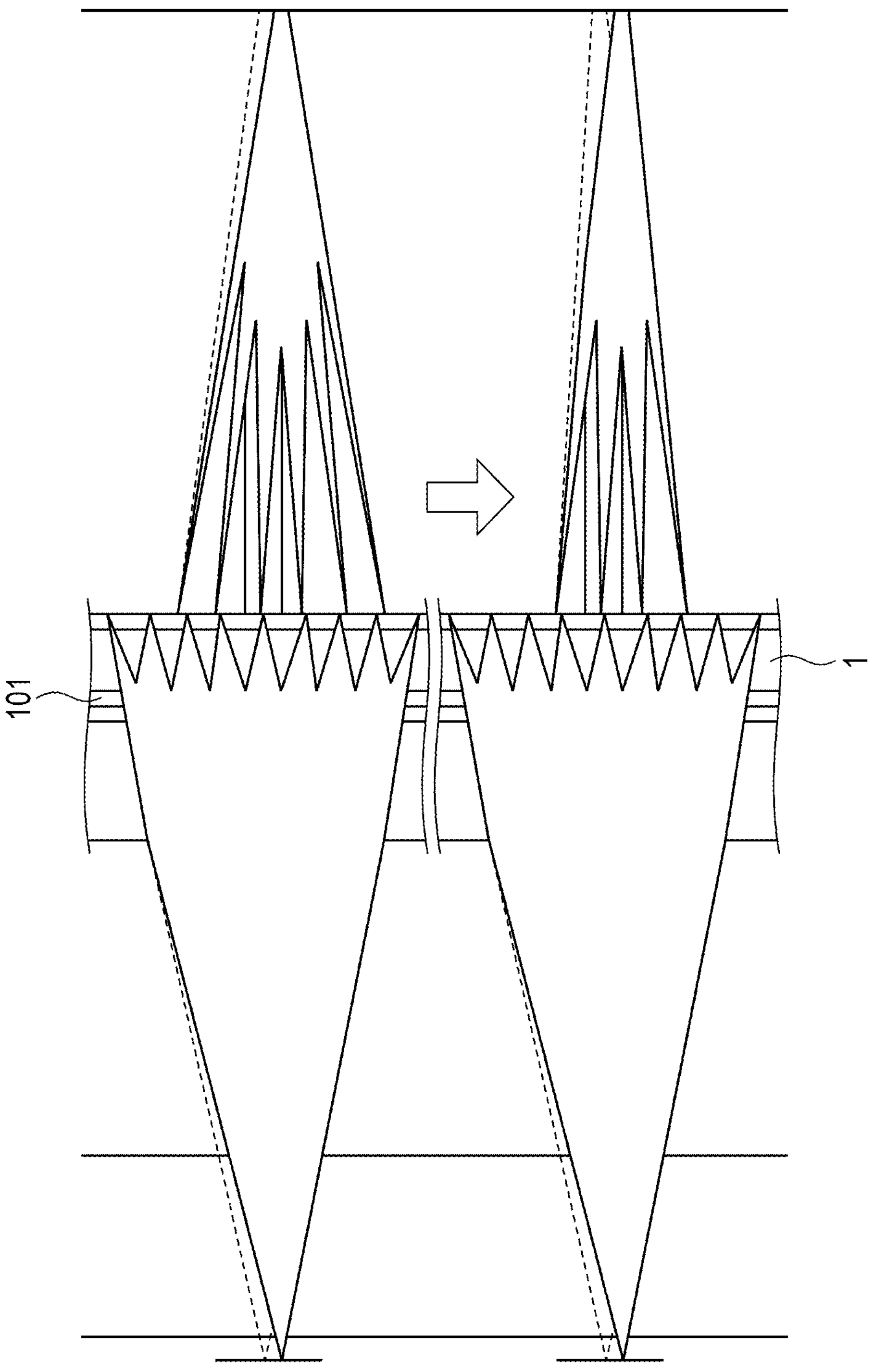
FIGS. 6A and 6B are diagrams for explanation of functions and effects.

Next, functions and effects by the provision of the travel blocking surfaces 6 between the downstream-side reflection surfaces 4 as in the embodiment will be explained with reference to FIGS. 6A, 6B, and 7. For comparison, FIG. 6A shows an optical path of a light transmitted through a lens-mirror array 101 without the travel blocking surfaces 6 between the downstream-side reflection surfaces 4 or the light-shielding films 62 between the downstream-side reflection surfaces 4 in planar development. FIG. 6B shows an optical path of a light transmitted through the lens-mirror array 1 according to the first embodiment with the light-shielding films 62 on the travel blocking surfaces 6 between the plurality of downstream-side reflection surfaces 4 in planar development.

As described above, one optical element 90 of the lens-mirror array 1 images the lights from the plurality of object points arranged in the main-scan directions on the image surface. In a different view, as shown in FIGS. 6A and 6B, a light from one object point enters the plurality of optical elements 90 arranged in the main-scan directions of the lens-mirror array 1 and is imaged at one imaging point. The light from the object point is a diffused light and the light guided and output by the lens-mirror array 1 becomes a light focused toward the imaging point. The light passing through the lens-mirror array 1 is shaped by the light-shielding films 33 around the upstream-side reflection surfaces 3 of the respective optical elements 90 and the light-shielding films 62 provided on the travel blocking surfaces 6 on both sides in the main-scan directions of the downstream-side reflection surfaces 4. Accordingly, of the plurality of optical elements 90 into which the light from one object point enters, the lights guided by some optical elements 90 on both sides in the main-scan directions are not imaged at the imaging point.

For example, in the lens-mirror array 101 of the comparative example shown in FIG. 6A, a light from one object point enters nine optical elements arranged in the main-scan directions and the lights output from the center six optical elements are imaged at the imaging point. On the other hand, in the lens-mirror array 1 of the first embodiment having the light-shielding films 62 between the downstream-side reflection surfaces 4, a light from one object point enters nine optical elements arranged in the main-scan directions and the lights output from the center four optical elements are imaged at the imaging point. That is, when the lens-mirror array 1 of the embodiment is used, the widths in the main-scan directions of the downstream-side reflection surfaces 4 are reduced by the light-shielding films 62 provided on the travel blocking surfaces 6 and the reflected lights reflected by the downstream-side reflection surfaces 4 are restricted in the main-scan directions, and thereby, the angles in the main-scan directions of the incident beams reaching the image surface may be reduced, and the numerical aperture (NA) becomes smaller and the depth of field may be increased.

The widths in the main-scan directions of the downstream-side reflection surfaces 4 are reduced by provision of the travel blocking surfaces 6 and the light-shielding films 62 as in the lens-mirror array 1 of the embodiment, and thereby, the number of optical elements 90 through which the light to be imaged at one imaging point passes may be reduced, and the contrast in the best position on the image surface may be increased and the depth of field may be increased. However, if the widths of the travel blocking surfaces 6 on which the light-shielding films 62 are provided are too large, the amounts of light becomes too small, and, if the widths of the travel blocking surfaces 6 are too small, the embodiment is not so different from the comparative example. Therefore, there is a proper value for the width of the travel blocking surfaces 6.

Figure 7:
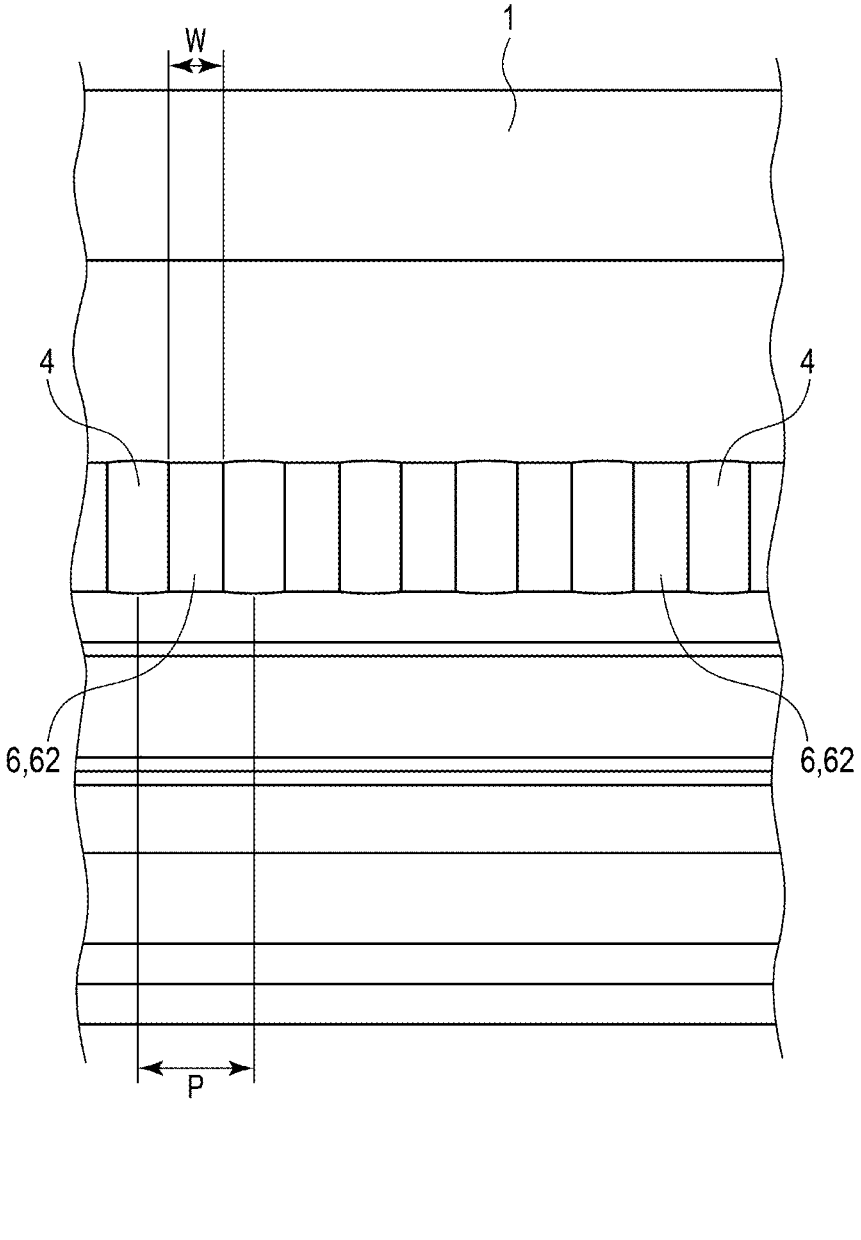
FIG. 7 is a diagram for explanation of proper values of a pitch of downstream-side reflection surfaces and a width of travel blocking surfaces.

For searching for the proper value, as shown in FIG. 7, with the pitch in the main-scan directions of the plurality of downstream-side reflection surfaces 4 as P [μm] and the width of the travel blocking surfaces 6 in the main-scan directions as W [μm], lights imaged on the image surface were monitored with varied ratios between P and W. As a result, it is known that good optical performance is obtained when the width of the travel blocking surfaces 6 is set to 0.35 to 0.95 times the pitch P of the downstream-side reflection surfaces 4 (i.e., the pitch of the optical elements 90). In the embodiment, W/P was designed in a range from 0.35 to 0.95 and the ratio between W and Pis set so that the lights guided by the three to five optical elements 90 may be imaged at one imaging point.

The travel blocking surfaces 6 are provided with no level differences between the downstream-side reflection surfaces 4 as in the lens-mirror array 1 of the embodiment, and thereby, at molding of the lens-mirror array 1, flows of the resin of the parts corresponding to the edges 61 may be made smoother and the shape accuracy of the downstream-side reflection surfaces 4 may be made higher. Further, according to the lens-mirror array 1 of the embodiment, the light-shielding ink may be successfully wetly spread over the travel blocking surfaces 6 using the capillary action of the edges 61 between the downstream-side reflection surfaces 4 and the travel blocking surfaces 6 and the shapes of the light-shielding films 62 may be stabilized. Therefore, according to the embodiment, the contrast in the best position on the image surface may be increased and the depth of field may be increased, and good optical performance may be obtained.

Figure 8:
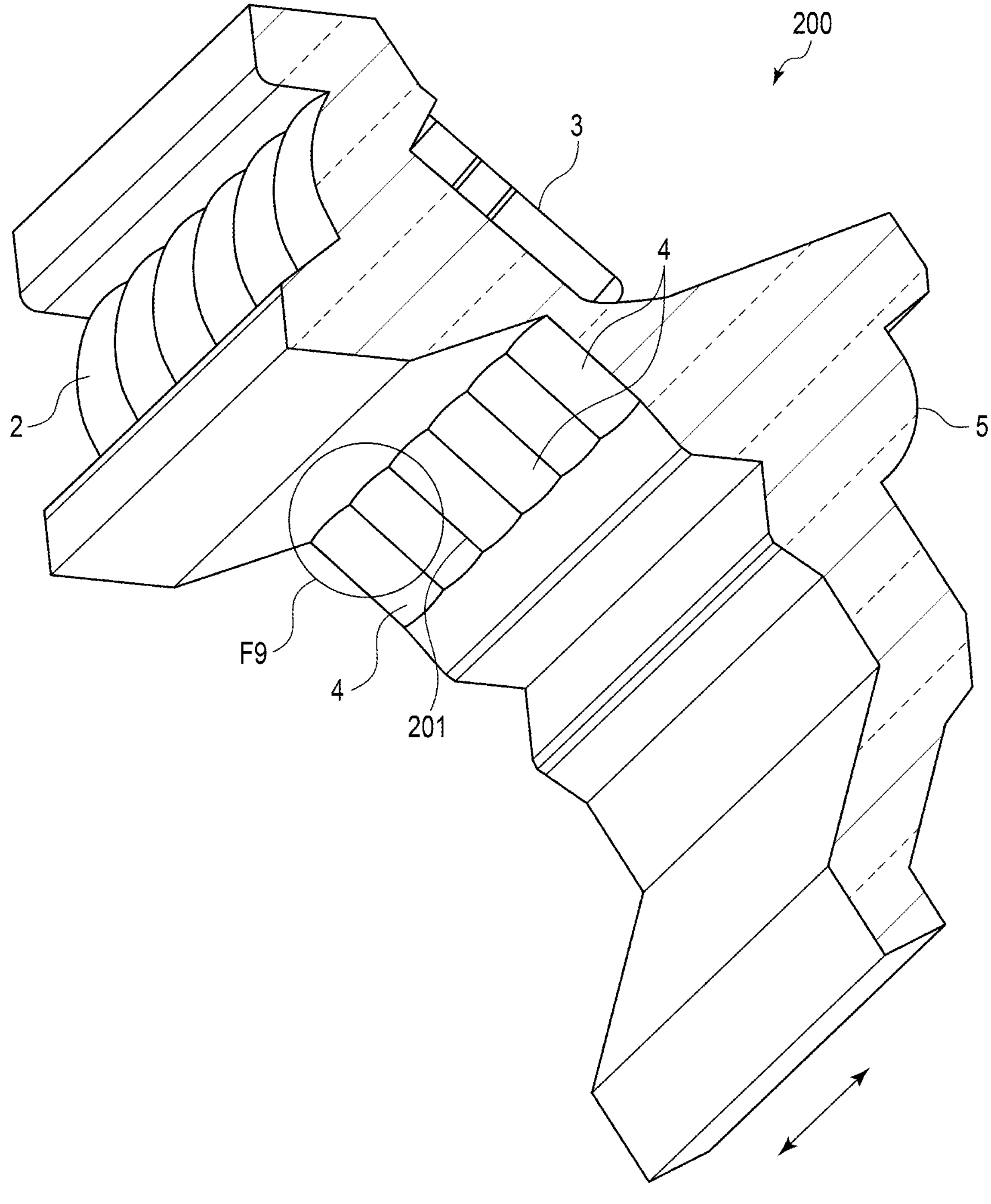
FIG. 8 is an appearance perspective view showing a lens-mirror array according to a second embodiment.
Figure 9:
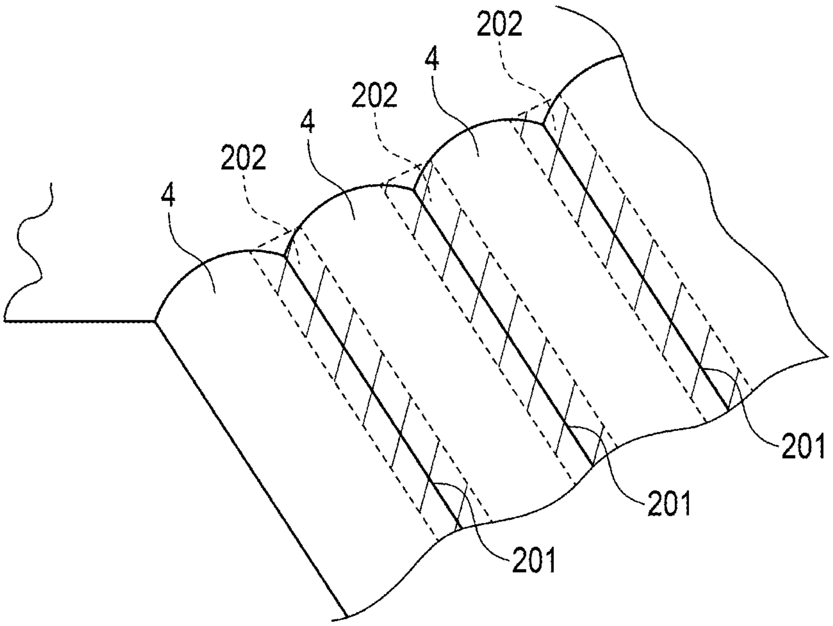
FIG. 9 is a partially enlarged view of an area F9 of the lens-mirror array in FIG. 8.

FIG. 8 is a partially enlarged perspective view showing a lens-mirror array 200 according to a second embodiment, and FIG. 9 is a partially enlarged perspective view of an area F9 of the lens mirror array 200 in FIG. 8.

The lens-mirror array 200 has substantially the same structure as the above described lens-mirror array 1 of the first embodiment except that the lens mirror array 200 has edges 201 (corner portions) in place of the travel blocking surfaces 6 between the plurality of downstream-side reflection surfaces 4 and light-shielding films 202 covering the edges 201 are provided between the downstream-side reflection surfaces 4 of the two optical elements 90 adjacent to each other in the main-scan directions. Accordingly, here, the different configurations from those of the above described lens-mirror array 1 of the first embodiment are explained and the component elements having the same functions as those of the lens-mirror array 1 of the first embodiment have the same signs and the detailed explanation thereof will be omitted.

The downstream-side reflection surface 4 is a free-form surface having positive optical power (e.g., functioning as a converging lens) reflecting and focusing the reflected light reflected by the upstream-side reflection surface 3 toward the exit-side lens surface 5 and bulging to the outside of the lens-mirror array 200. The downstream-side reflection surfaces 4 of the two optical elements 90 adjacent to each other in the main-scan directions are adjacent to each other via the edge 201 (e.g., the downstream-side reflection surfaces 4 meet or intersect at the edge 201). That is, the width in the main-scan directions of the downstream-side reflection surface 4 of the lens-mirror array 200 of the embodiment is substantially the same as the width in the main-scan directions of the optical element 90.

The edge 201 is a recessed groove provided in a part in which the two downstream-side reflection surfaces 4 adjacent to each other in the main-scan directions cross and functions to absorb the light-shielding ink by capillary action like the edge 61 of the lens-mirror array 1 of the first embodiment. The lens-mirror array 200 of the embodiment has no travel blocking surfaces 6, and the light-shielding films 202 are formed to have a predetermined width in the main-scan directions and cover the edges 201.

As described above, according to the lens-mirror array 200 of the second embodiment, like the above described first embodiment, the plurality of downstream-side reflection surfaces 4 arranged in the main-scan directions are continuous without level differences via the edges 201, and the flows of the resin are not disturbed at molding of the lens-mirror array 200 and the shape accuracy of the downstream-side reflection surfaces 4 may be increased.

While certain embodiments have been described, these embodiments are presented as examples, but not intended to limit the scope of the invention. These novel embodiments may be implemented in other various forms and various omissions, replacements, changes may be made without departing from the scope of the invention. These embodiments or their modifications are within the scope of the invention and within the scope of the invention described in claims and equivalents thereof.

What is claimed is:

1. A lens-mirror array comprising:

a first optical element including:

an incident surface shaped to transmit and focus light incident on the incident surface;

a first reflection surface having a profile that curves between a first edge and a second edge and having a positive optical power and configured to reflect and focus the light entering through the incident surface; and an exit surface outputting the light reflected by the first reflection surface;

a second optical element arranged adjacent to the first optical element in a main-scan direction, the second optical element including a second reflection surface having a profile that curves between a third edge and a fourth edge;

a travel blocking portion provided between the first edge of the first reflection surface of the first optical element and the third edge of the second reflection surface of the second optical element, the travel blocking portion having no level difference between the first edge and the third edge; and a reflectance reduction layer provided in the travel blocking portion to set light reflectance in the travel blocking portion to be lower than that of the first reflection surface.

2. The lens-mirror array of claim 1, wherein the travel blocking portion is provided between the first reflection surface and the second reflection surface without a level difference.

3. The lens-mirror array of claim 1, wherein the travel blocking portion intersects the first reflection surface and the second reflection surface.

4. The lens-mirror array of claim 1, wherein the travel blocking portion includes a corner portion positioned at the first edge of the first reflection surface in the main-scan direction.

5. The lens-mirror array of claim 4, wherein the reflectance reduction layer includes a light-shielding ink.

6. The lens-mirror array of claim 5, wherein the corner portion generates capillary action to facilitate spreading the light-shielding ink along the travel blocking portion.

7. The lens-mirror array of claim 4, wherein the travel blocking portion includes a processed surface that extends continuously from the first reflection surface to the second reflection surface.

8. The lens-mirror array of claim 7, wherein the corner portion is a first corner portion, wherein the processed surface meets the first edge of the first reflection surface at the first corner portion without a level difference between the first edge of the first reflection surface and the processed surface, and wherein the processed surface meets the third edge of the second reflection surface at a second corner portion without a level difference between the third edge of the second reflection surface and the processed surface.

9. The lens-mirror array of claim 7, further comprising a third optical element, wherein a width of the processed surface in the main-scan direction permits a light from one object point to be guided by the first optical element, the second optical element, and the third optical element and imaged at the one imaging point.

10. The lens-mirror array of claim 9, further comprising a fourth optical element and a fifth optical element, wherein the width of the processed surface in the main-scan direction permits the light from the one object point to be guided by the first optical element, the second optical element, the third optical element, the fourth optical element, and the fifth optical element and imaged at the imaging point.

11. The lens-mirror array of claim 4, wherein the first reflection surface of the first optical element and the second reflection surface of the second optical element meet at the corner portion.

12. The lens-mirror array of claim 1, wherein the first optical element further includes a third reflection surface configured to reflect the light toward the first reflection surface.

13. The lens-mirror array of claim 1, wherein the first reflection surface defines a same width along an entire length of the first reflection surface.

14. The lens-mirror array of claim 1, wherein the travel blocking portion defines a same width along an entire length of the travel blocking portion.

15. A scanner comprising:

a frame;

an image sensor coupled to the frame; and a lens-mirror array coupled to the frame and including:

a first optical element including:

an incident surface shaped to transmit and focus light incident on the incident surface;

a first reflection surface having a profile that curves between a first edge and a second edge and having a positive optical power and configured to reflect and focus the light entering through the incident surface; and an exit surface outputting the light reflected by the first reflection surface toward the image sensor;

a second optical element arranged adjacent to the first optical element in a main-scan direction, the second optical element including a second reflection surface having a profile that curves between a third edge and a fourth edge;

a travel blocking portion provided between the first edge of the first reflection surface of the first optical element and the third edge of the second reflection surface of the second optical element, the travel blocking portion having no level difference between the first edge and the third edge; and a reflectance reduction layer provided in the travel blocking portion to set light reflectance in the travel blocking portion to be lower than that of the first reflection surface.

16. The scanner of claim 15, wherein the frame defines an aperture positioned to transmit the light toward the incident surface.

17. The scanner of claim 16, further comprising a first light guide and a second light guide coupled to the frame, wherein the frame includes a protrusion that extends between the first light guide and the second light guide and defines the aperture.

18. A lens-mirror array comprising:

a plurality of optical elements arranged in a main-scan direction, each optical element including:

an incident surface;

a reflection surface having a profile that curves between a pair of edges and configured to reflect and focus light entering through the incident surface; and an exit surface outputting the light reflected by the reflection surface;

a travel blocking portion intersecting an edge of the reflection surface of a first optical element and an edge of a second optical element adjacent to the first optical element in the main-scan direction, the travel blocking portion having no level difference between the edge of the reflection surface of the first optical element and the edge of the reflection surface of the second optical element; and a reflectance reduction layer provided in the travel blocking portion to set light reflectance in the travel blocking portion to be lower than that of the reflection surfaces intersected by the travel blocking portion.

19. The lens-mirror array of claim 18, wherein the travel blocking portion includes a surface that intersects the edges of the reflection surfaces of the two of the optical elements to form a pair of corner portions, and wherein the corner portions are offset from one another in the main-scan direction.

20. The lens-mirror array of claim 18, wherein the travel blocking portion is a corner portion formed by an intersection of the reflection surfaces of the two of the optical elements with one another.

* * * * *